US005417458A

United States Patent [19]

Best et al.

[11] Patent Number: 5,417,458

[45] Date of Patent: May 23, 1995

[54] METHOD FOR FABRICATING A COUPON REDEMPTION CARD AND ASSEMBLY

[75] Inventors: Scott D. Best, Troy; James F. Turner, Farmington Hills, both of Mich.

[73] Assignee: Saxon, Incorporated, Ferndale, Mich.

[21] Appl. No.: 303,532

[22] Filed: Sep. 9, 1994

[51] Int. Cl.$^{6}$ .................................. G09B 19/00

[52] U.S. Cl. .................................. 283/51; 283/107

[58] Field of Search ................. 283/81, 101, 107, 108, 283/51, 116, 117; 428/40–42

[56] References Cited

U.S. PATENT DOCUMENTS 3,069,793 12/1962 Francescon .
3,623,944 11/1971 Davis .................................. 283/108
4,608,288 8/1986 Spindler .......................... 283/108 X
5,106,124 4/1992 Volkman et al. ..................... 283/81
5,143,466 9/1992 Moncrieff Baldwin et al. ..... 283/81
5,308,120 5/1994 Thompson .

*Primary Examiner*—Willmon Fridie

*Attorney, Agent, or Firm*—Reising, Ethington, Barnard, Perry & Milton

[57] ABSTRACT

A method for fabricating a coupon redemption card (10) includes removing the half (37) of a backing liner (28) used to back a front half (12) of a layer of card stock (16). The layer of card stock (16) is then folded in half along a score line (40) so that the front half (12) adheres to the back half (14). The back half (14) is scored along longitudinal and lateral lines (42) to create coupons (18) which, when removed, are peeled off of the remaining half (38) of the backing liner (28).

8 Claims, 1 Drawing Sheet

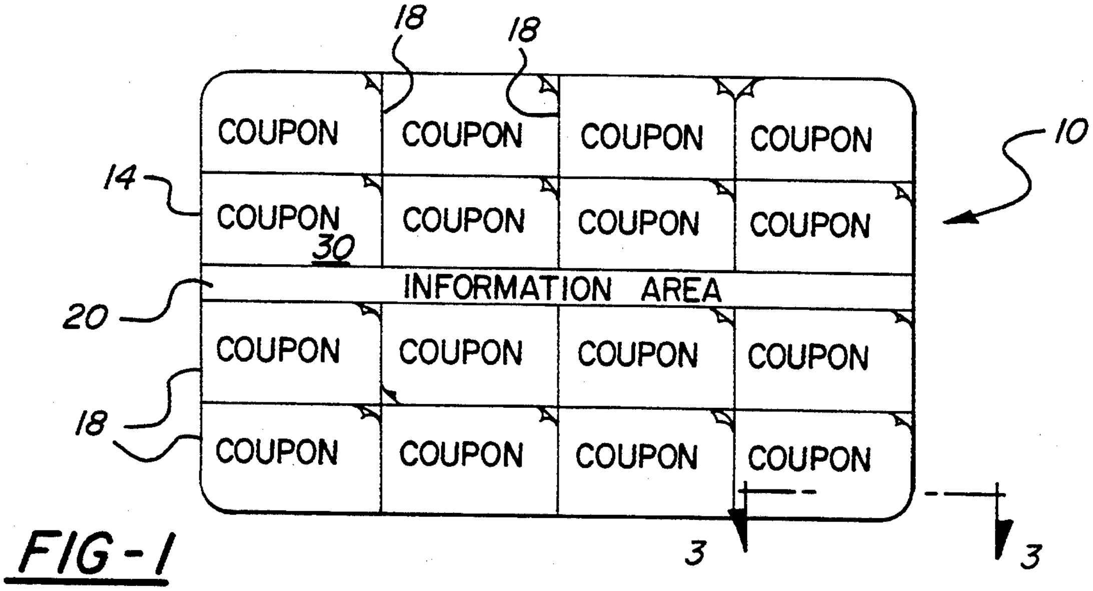
FIG-1
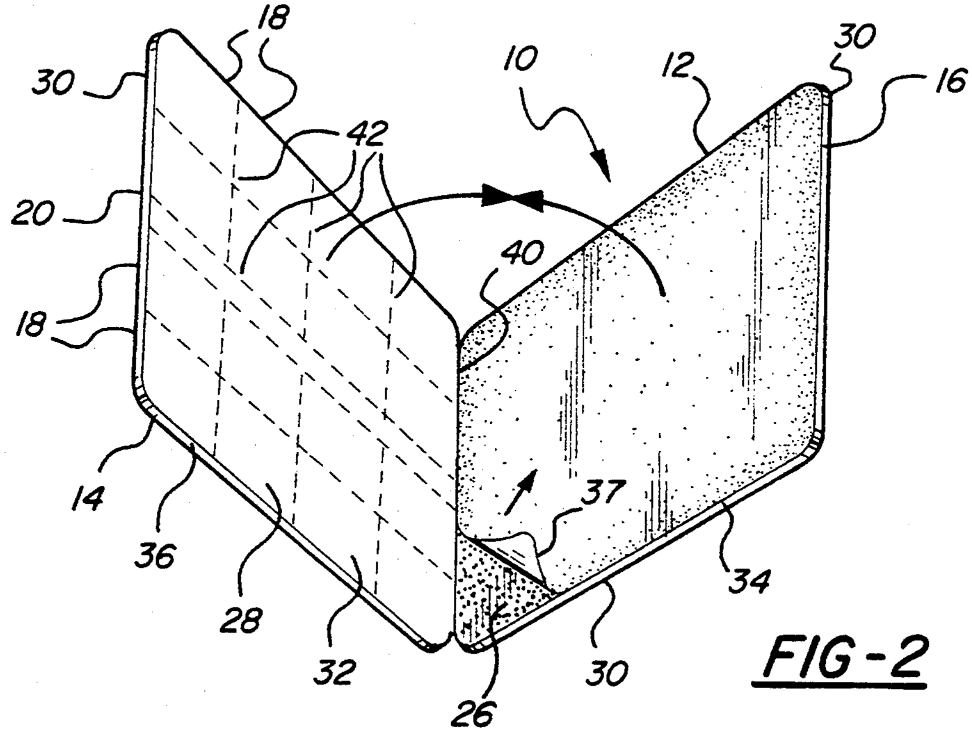
FIG-2
FIG-3
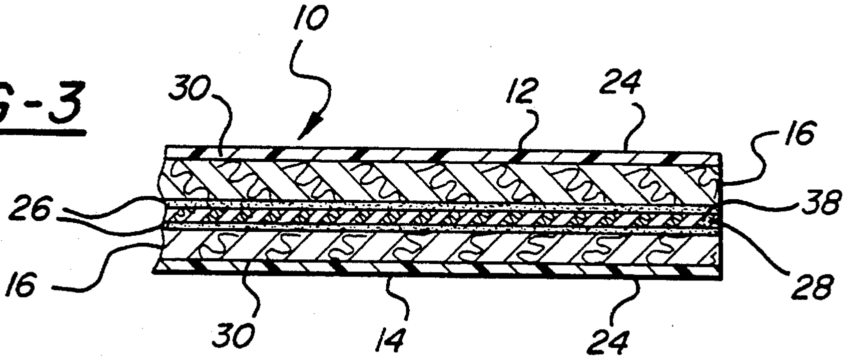

METHOD FOR FABRICATING A COUPON REDEMPTION CARD AND ASSEMBLY

BACKGROUND OF THE INVENTION

1. Technical Field

The invention relates to coupons. Specifically, the subject invention relates to coupons including laminated components removably adhered thereto.

2. Description of Related Art

Although the economy has made coupon redemption a necessity, the technology of printing and distributing coupons has not advanced significantly. One such advancement is disclosed in U.S. Pat. No. 5,308,120, issued to Thompson on May 3, 1994, wherein a peel off coupon redemption card is disclosed. The coupon card includes a plurality of mini coupons which may be peeled off individually and redeemed. The mini coupons are attached to a thin layer of laminated paper which, upon removal of each coupon, is weakened structurally because the laminated paper backing is an insufficient structural backing for a card which is going to be used repeatedly in a wallet environment. More specifically, the coupon redemption card will be bent repeatedly with each removal of a mini coupon exposing the adhesive of the remaining coupons predisposing the remaining mini coupons to fall off the coupon redemption card as well as having the coupon redemption card bend and fold undesirably.

U.S. Pat. No. 3,069,793, issued to Francescon on Aug. 8, 1960, discloses a credit card which is fabricated by folding a transparent film over a credit card blank. The transparent film surrounds the credit card blank. Although this reference discloses the concept of folding a transparent piece of material over an information bearing blank, such a structure is not conducive to the use of coupons. More specifically, removal of portions of the credit card blank in the manner which is required for coupon redemption would eliminate all structure, except one section of the transparent film, which would, in turn, reduce the credit card type structure to a flimsy piece of transparent film incapable of maintaining a form suitable to be stored and carried in a wallet.

SUMMARY OF THE INVENTION AND ADVANTAGES

The subject invention is a method for forming a card from a layer of card stock, laminate, and a layer of adhesive. The method comprises the steps of: printing information on a front surface of the layer of card stock; applying the laminate to the front surface; applying the adhesive layer to a back surface of the layer of card stock; and folding the layer of card stock in half such that one half of the back surface is adhered to another half of the back surface by the adhesive layer.

The subject method overcomes the disadvantages of the prior art by creating a coupon redemption card wherein the coupons are removed from the card with a sufficient layer of card stock remaining to maintain the support of the coupon redemption card and maintain structural integrity through the life of its use in a wallet-carrying environment.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of a coupon redemption card fabricated from the subject method;

FIG. 2 is a perspective view of the card stock and adhesive layer being folded to form a coupon redemption card; and FIG. 3 is a cross-sectional view taken along lines 3—3 of FIG. 1.

DETAILED DESCRIPTION OF THE DRAWINGS

The coupon redemption card, generally indicated at 10 in the Figures, is fabricated by the subject method. The coupon redemption card 10 includes a front half 12 and a back half 14. The front 12 and back 14 halves are fabricated from a single complete sheet of card stock 16 capable of having printed materials printed thereon. Typical printed materials on the front half 12 include manufacturing, marketing, charity information, and the like.

The back half 14 includes a plurality of coupons 18. The coupons 18 are removable upon redemption. Additional information may be printed on a portion of the back half 20, labeled "INFORMATION AREA" in FIG. 1.

The layer of card stock 16 is 130 lb. tag having a layer of 2 mil clear polyester laminate 24 permanently adhered thereto. A layer of adhesive 26, a special release permanent AT-1 adhesive with a 60 lb. machine finish liner 28, having a silicone finish (not shown) is attached thereto. The silicone layer allows the liner 28 to be removed from the layer of adhesive 26 without removing the adhesive 26 or damage the card stock 16.

The method for forming the coupon redemption card 10 from the layer of card stock 16, the laminate 24 and the layer of adhesive 26 includes the steps of printing information of the front surface 30 of the layer of card stock 16. The front surface 30 of the layer of card stock 16 includes the front half 12 having marketing information and the back half 14 including the coupons and related information. The laminate 24 is applied to the front surface 30. The method includes the step of applying the adhesive layer 26 to the back surface 32 of the layer of card stock 16. The final step includes folding the layer of card stock 16 in half 34 such that one half of the back surface 32 is adhered to the other half 36 of the back surface 32 by the adhesion layer 26.

The backing liner 28 is applied to the adhesive layer 26 during the manufacturing of the coupon redemption card 10. More specifically, the backing liner 28 is applied to the card stock 16 prior to folding the layer of card stock 16. The liner 28 provides backing for the card stock 16 as well as ensures the proper handling and packaging of the card stock 16 when the adhesive layer 26 is affixed thereto.

The method further includes the step of removing one half 37 of the backing liner 28 prior to folding the layer of card stock 16. The half 37 of the backing liner 28 which is removed corresponds to that half which is behind the surface containing the marketing information, i.e., the front half 12.

The remaining half 38 of the backing liner 28 must remain on the back half 14, i.e., the half 14 comprising the coupons 18, to ensure the coupons 18 remain intact and do not fall away from each other. Further, the backing 38 must remain behind the coupons 18 to ensure the coupons 18 may be removed cleanly with all the adhesive located therebehind thus eliminating the possibility of the coupon redemption because the coupons 18 would otherwise be stuck to the front half 12.

The method further includes the step of scoring the layer of card stock 16 to create symmetric halves. Scoring along line 40 ensures that the card stock 16 will be folded along line 40 such that all the adhesive 26 will be received by the remaining half 32 of the backing liner 28.

The front surface 30 corresponding to the back half 14 is scored a plurality of times along lines 42 to create the coupons 18 and the ADDITIONAL INFORMATION AREA 20. The scores along lines 42 are substantial enough such that the coupons 18 are individually removable without effecting the adhesion of the remaining coupons 18 which have not be selected to be removed. The scores 42 do not, however, sever the backing liner 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for forming a card from a layer of card stock (16), laminate (24), and a layer of adhesive (26), the method comprising the steps of:

printing information on the front surface (30) of the layer of card (16);

applying the laminate (24) to the front surface ( 30 );

applying the adhesive layer (26) to a back surface (32) of the layer of card stock (16); and folding the layer of card stock (16) in half, such that one half of the back surface (32) is adhered to another half of the back surface (32) by the adhesion layer (26).

2. A method as set forth in claim 1 further characterized by a step of scoring (40) the layer of card stock ( 16 ) to create symmetric halves.

3. A method as set forth in claim 2 further characterized by applying the back liner (28) to the adhesive layer (26) prior to folding the layer of card stock (16).

4. A method as set forth in claim 3 further characterized by removing one half (37) of the backing liner (28) prior to folding the layer of card stock (16).

5. A method as set forth in claim 4 further characterized by scoring (42) the front surface (30) of the layer of card stock (16) to create a plurality of individually removable sections (18).

6. A method as set forth in claim 5 further characterized by peeling the removable sections (18) off of the one half of the backing lines (32) independently thereof to redeem the removable sections (18).

7. A coupon card (10) comprising:

a single layer of card stock (16) having a front surface (30) folded in half along a score line (40) defining front (12) and back (14) halves;

a layer of laminate (24) adhered to said front surface (30);

a single layer of liner (28) coextensive with said front (12) and said back (14) halves and sandwiched therebetween; and a layer of adhesive extending between said single layer of card stock (16) and said single layer of liner (28) adhering said front (12) and back (14) halves to said single layer of liner (28).

8. An assembly (10) as set forth in claim 7 further characterized by said back half (14) including a plurality of score lines (42) to create a plurality of coupons (18).

* * * * *